May 19, 1970 P. J. VANDERKROGT 3,512,659
TRAVELLING BALE STACKER
Original Filed March 11, 1966 6 Sheets-Sheet 3

Peter J. Vanderkrogt Inventor
By Cushman, Darby & Cushman
Attorneys

3,512,659
TRAVELLING BALE STACKER

Peter J. Vanderkrogt, Calgary, Alberta, Canada, assignor to Canada Iron Foundries Limited, a corporation of Canada
Continuation of application Ser. No. 533,463, Mar. 11, 1966. This application Apr. 8, 1968, Ser. No. 719,380
Int. Cl. B65g 57/20
U.S. Cl. 214—6                                                          7 Claims

ABSTRACT OF THE DISCLOSURE

This invention relates to an automatic travelling bale stacker adapted to be hitched to a baler to receive ejected bales on a bale ramp and guide them to a bale turner adapted to orient the bales in a predetermined position in a placing rack.

---

This is a continuation of my earlier copending application Ser. No. 533,463, filed Mar. 11, 1966, now abandoned.

This invention relates to an automatic travelling bale stacker adapted to be hitched to a baler and to receive ejected bales, assemble these bales into a prearranged stack pattern so that they will shed water, and lower the assembled stack onto the ground.

Automatic travelling bale stackers adapted to be attached to balers and arrange bales into water shedding stacks are known in the art. These automatic travelling bale stackers are operated by motors or by wheel drive with associated transmissions, and clutches. The travelling bale stackers in the prior art have nonswinging stook racks. When the stook rack is lowered going into a turn the bottom stooks make contact with the ground, however the stook rack continuing through the turn jolts the assembled stooks such that they fall to the ground.

The motors, transmission and clutch components of the prior travelling bale stackers require the constant care normally associated with heavy machinery. In the present invention, the only force utilized is that of the baler. Consequently, the instant invention can be cheaply maintained and repaired as the power requirements to operate the bale stacker are minimum. The travelling bale stacker to be described herein also provides a swivelling stook rack so that the bales may be placed on the ground in a prearranged stack pattern while turning in the field. This bale stacker can with minor adjustments stack bales in different prearranged patterns.

The invention is illustrated, by way of example, in the accompanying drawings in which.

Figure 1:
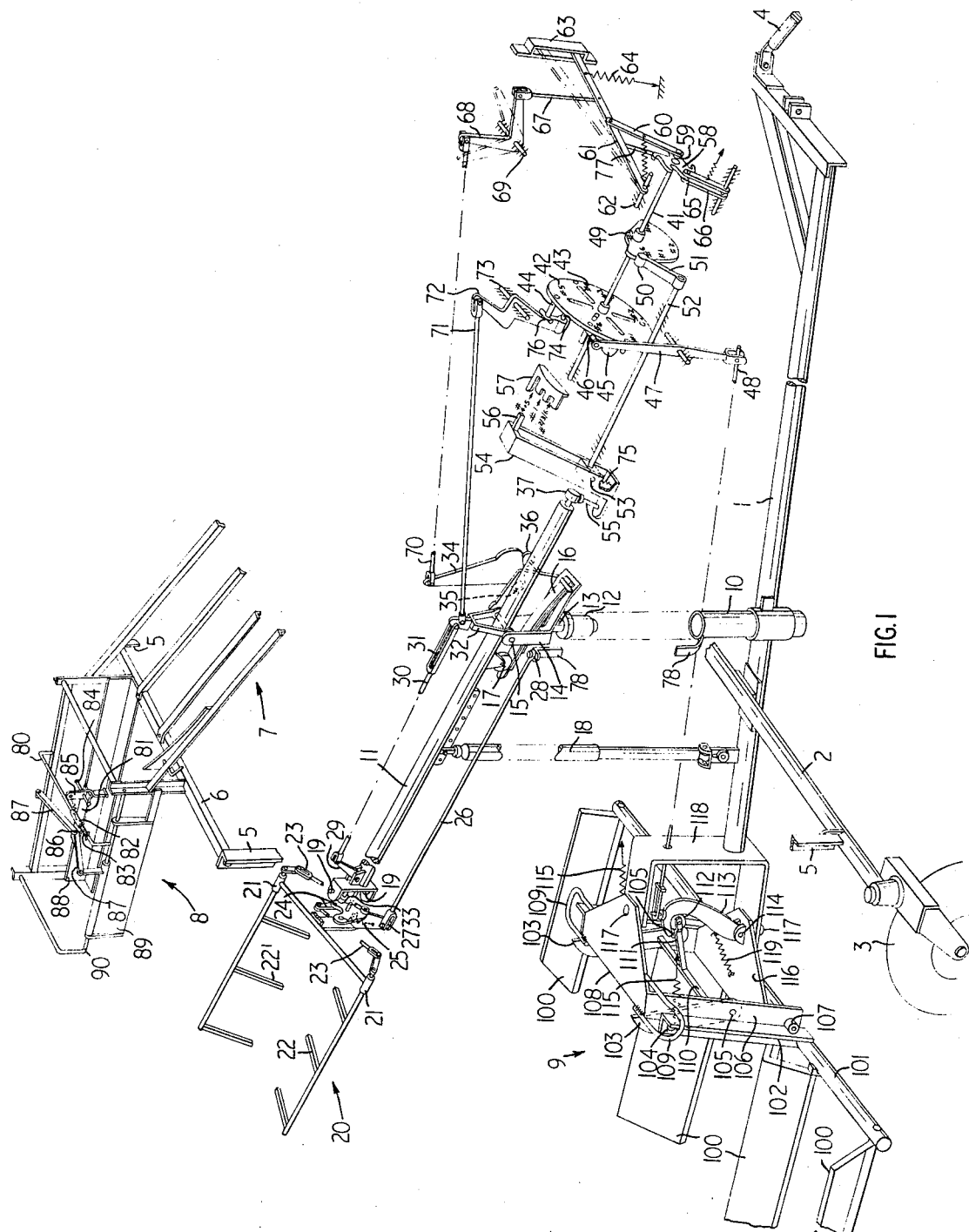
FIG. 1 is an exploded perspective diagrammatic view of the automatic travelling bale stacker.

Referring to the drawings, the invention includes:

OPERATING MECHANISM AND PLACING-RACK

The travelling bale stacker includes a longitudinal frame 1 and a cross-frame 2 supported by swivel wheels 3 and provided with a hitch assembly 4 at the leading end of the frame 1 for attachment to the normal automatic baler (not shown).

The cross-frame 2 is provided with vertically and rearwardly extending support members 5 connected at their upper ends by a cross-bar 6. A bale ramp, indicated generally at 7, extends at an angle to the longitudinal axis of the machine from adjacent the hitch 4 to the cross-bar 6, the latter serving to support a bale-turner indicated generally at 8.

The trailing end of the frame 1 serves to support a stook-rack indicated generally at 9, which will be described in greater detail hereinafter.

Secured to the frame 1, in advance of the cross-frame 2, is a vertical pivot support 10 adapted to pivotally support an actuating or placing lever 11 for pivotal movement of the latter in a horizontal plane. The support 10 is adapted to receive a pivot bearing 12 housing the lower end of a shaft 13 fast on the underside of a yoke 14 pivoted to placing lever 11 at 15, said placing lever 11 being capable of pivotal movement in a vertical plane about pivot 15. A leaf-spring 16 carried by the yoke 14 is adapted to cooperate with a roller 17 journalled on the underside of the placing lever 11. A shock absorber 18 also connects the frame 1 to the placing lever 11 and is adjustable for bales of different weights such as, for example, hay or straw.

Pivotally mounted at 19 to the trailing end of the placing lever 11, and located between the stook-rack 9 and bale-turner 8, is a bale-placing rack, indicated generally at 20, which includes a pair of mutually opposed pivotal side members 21 each carrying a plurality of side bars 22, 22'. Each side member 21 is connected by linkage, including a slotted connecting rod 23, to an associated notched placing-rack lock 24 provided with a biasing spring 25. A tie rod 26 is pivoted at one end 27 to the placing-rack 20 and, at its other end 28, to the pivot support 10 by means of a bracket 78. Also pivotally mounted on the trailing end of the placing lever 11 adjacent the rack 20 is a rack locking lever 29 which is, in turn, connected to a first pull rod 30 connected and spring biased, at its other end 31, to a saddle 32 mounted on pivot 15. The operative end 33 of the locking lever 29 normally cooperates with a notch formed in each rack lock 24 to enable the latter normally to retain the side bars 22, 22' of the placing-rack 20 in closed or bale-receiving position.

A cam lever 34, pivoted at 35 to yoke 14, is adapted to cooperate with a roller 36 mounted on the side of the placing lever 11, the leading end of which is provided with a roller 37, the purpose of which will be described hereinafter.

Figure 2:
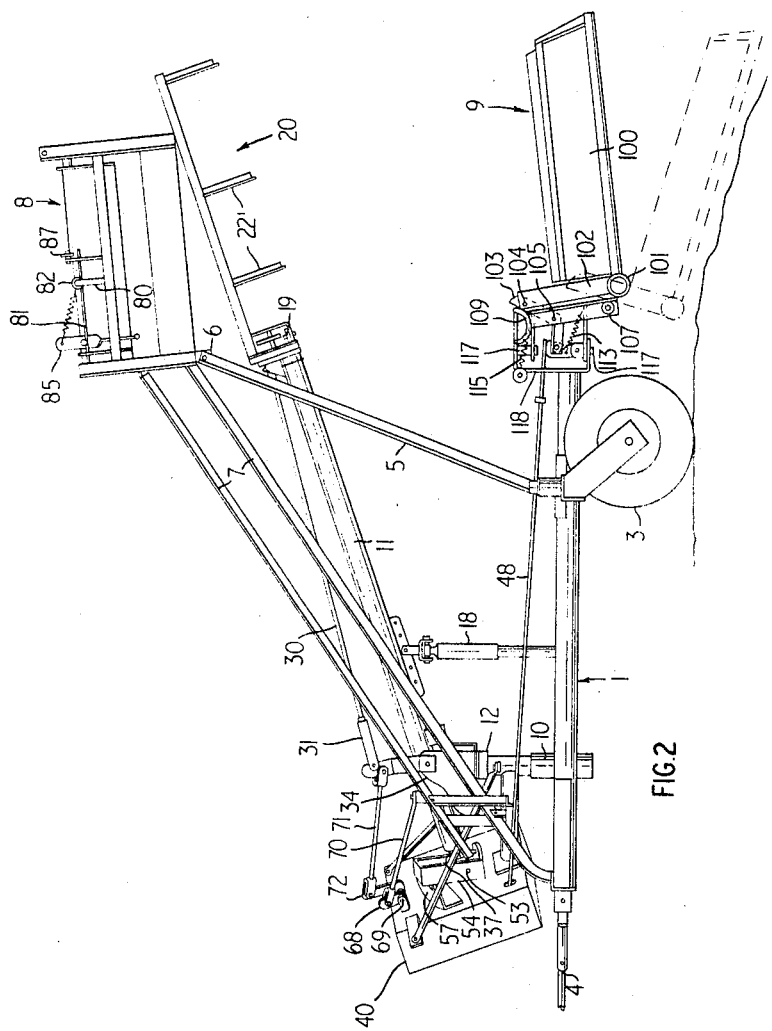
FIG. 2 is a side elevation of the machine.
Figure 3:
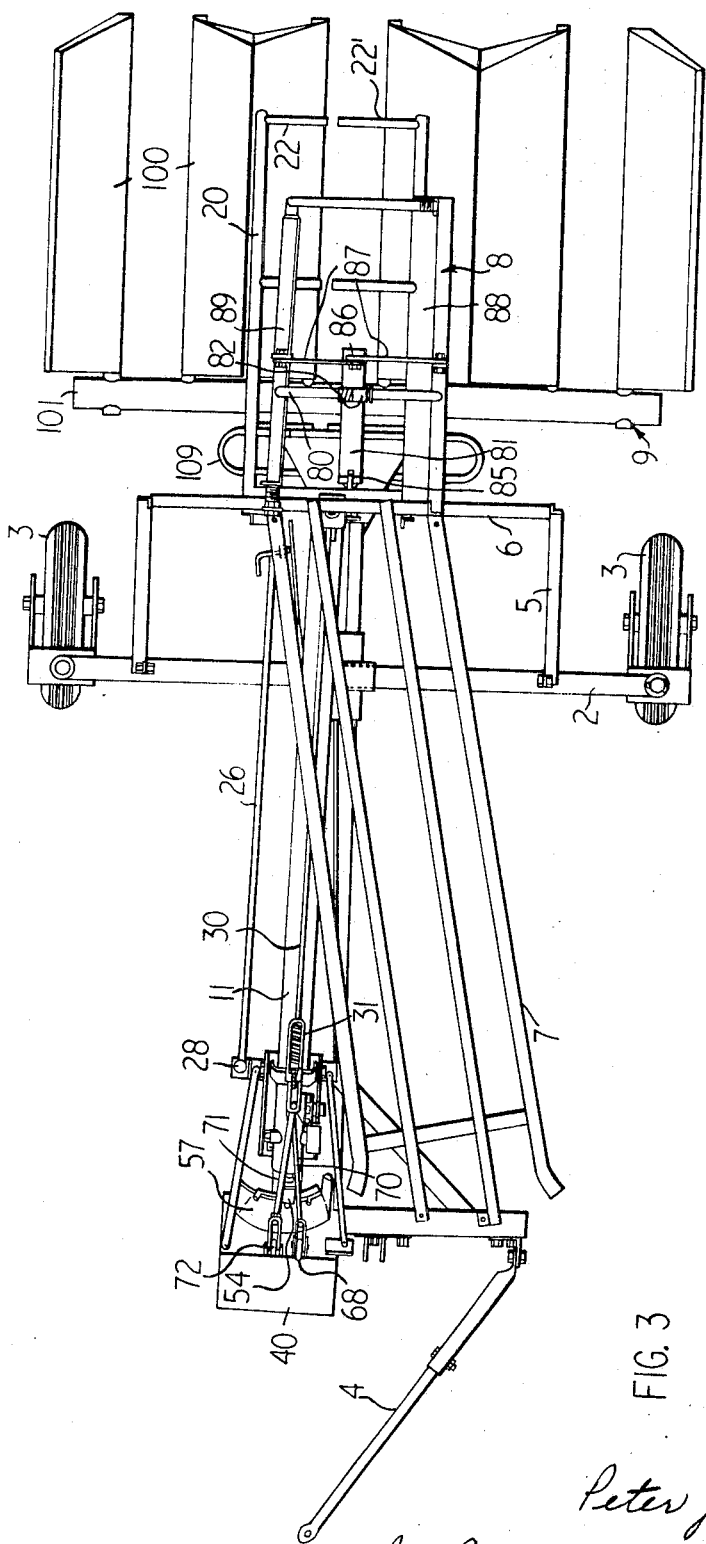
FIG. 3 is a plan view of the machine.

A control housing, indicated generally at 40 in FIGS. 2 and 3, is located adjacent the leading end of the machine. Journalled within the control housing 40 is a shaft 41 (see FIG. 1) on which a placing-rack control opening disc 42 is mounted, said disc being provided with a plurality of radial slots 43 and a corresponding number of studs 44 each adjustable in the amount of length projecting from the rear face thereof. Although six such slots and studs are shown, the number thereof will be dependent upon the number of bales to be stacked. The periphery of the disc 42 also carries a release trip 45 adapted to cooperate with a roller 46 carried by the upper end of a pivoted trip lever 47, the lower end of which is mounted on one end of a connecting rod 48 which is connected, at its other end, to stook-rack locking and actuating mechanism to be described hereinafter.

The shaft 41 also has a positional control cam plate 49 mounted thereon, the cam surface of which cooperates with a roller 50 carried by the upper end of a lever 51 mounted on the forward end of a further shaft 52. The trailing end of shaft 52 extends through the rear face of the control housing 40 where it is connected at 53 to a pivotable positioning guide 54 provided on its lower end with a stud 55 engageable by the roller 37 carried by the leading end of placing lever 11 and, at its upper end, with a projecting latch 56. The latch 56 cooperates with a guide lock 57 secured on the outside of the rear face of the control housing 40 and provided with a plurality of bale-positioning slots selectively engageable by the latch 56.

Mounted on the forward end of shaft 41 is a ratchet wheel 58 which is adapted to cooperate with a roller 59 mounted on the lower end of a depending lever 60 which is connected, at its upper end to a cross-lever 61. Ratchet wheel 58, cam plate 49, and disc 42 are all keyed to shaft 41. One end of the cross-lever 61 is pivoted at 62 and the other end is adapted to move within a fixed guide 63 against the action of a spring 64. The ratchet wheel 58 also cooperates with a roller 65 carried by a spring-biased back-stop lever 66. Moreover, the cross-lever 61 is connected, by a vertical lever 67, to the lower end of a bell-crank lever 68 pivoted at 69, the upper end of the bell-crank lever 68 being connected to one end of a pull rod 70 whose other end is connected to the cam lever 34.

The saddle 32 is connected to one end of a further pull rod 71 which is connected, at its other end, to a placing-rack opening lever 72, pivoted at 73, provided with a projecting pin 74 selectively engageable with the slots 43 formed in the placing-rack opening disc 42. The lever 72 is also provided with a projecting stop 76.

BALE-TURNER

The bale-turner 8 includes a transverse bar 80 and a longitudinal lever 81 pivotally secured to the latter by means of a sleeve 82 having a coil spring 83 imparting a clockwise movement to the lever 81. One end of the lever 81 is bifurcated to pivotally support, at 84, a spring-tensioned vertical lever 85. The other end of lever 81 supports the pivotal connection 86 between a pair of transversely extending levers 87. The bale-turner 8 also includes a support ledge 88 and a turning plate 89 which is operatively connected to the levers 87 for pivotal movement about a longitudinal rod 90 as will be explained hereinafter.

STOOK RACK

The stook rack 9 includes a plurality of bale supports 100 extending rearwardly from a cross-brace 101 secured to the lower ends of vertical supports 102. A pair of levers 103 are pivotally connected at 104 to the upper ends of the supports 102, the lower ends of said levers being pivotally secured at 105 to fixed upright side members 106 each provided with a roller 107. The upper ends of the side members 106 are fast with a top plate 108 each side of which is provided with a swivel stop bar 109 extending outwardly and downwardly therefrom, the upper ends of levers 103, when in their uppermost position shown in FIG. 1, resting against said stop bars 109.

The lower ends of the levers 103 are connected together by a cross-bar 110 provided with a central and forwardly extending arm 111 carrying a roller 112 adapted to cooperate with a spring-biased catch 113 pivoted at 114 at its lower end and connected, at its upper end, to the trailing end of connecting rod 48. Each lever 103 is connected to a tension spring 115 and the upright side members 106 are fast with a bottom plate 116. The top and bottom plates 108, 116 are pivotally mounted at 117 to a bracket 118 fast on the trailing end of frame 1 for swivelling movement of the assembly on said frame 1.

OPERATION OF BALE-TURNER AND PLACING-RACK

The machine is hitched to a normal automatic baler (not shown) by means of the hitch assembly 4 so that the bale ramp 7 leading to the bale-turner 8 is maintained in constant alignment with the bale chamber of the automatic baler, the latter ejecting the bales up the ramp 7 to the bale-turner 8.

Figure 6A:
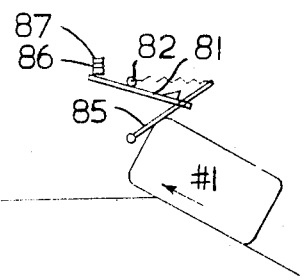
FIGS. 6a to 6c are diagrammatic views of bales in the bale-turning portion of the machine.
Figure 6B:
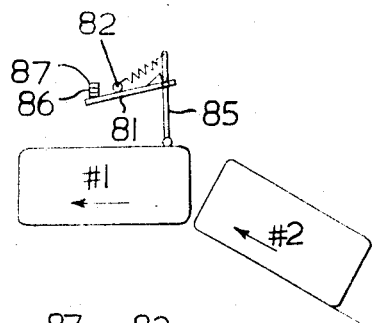
Figure 6C:
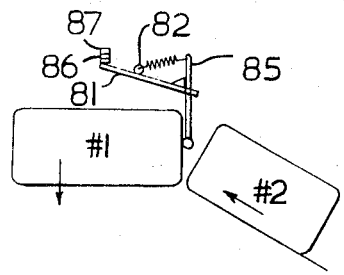

As the bale #1 enters the bale-turner 8, the leading end of the bale (see FIG. 6a) pivots the depending end of lever 85 against the action of its spring and, simultaneously, the bifurcated end of lever 81 is raised against the tension of spring 83. When the leading end of bale #1 passes beyond lever 85, the latter will return to its normal position where, as will be seen from FIG. 6c, it will be located between the trailing end of bale #1 and the leading end of bale #2. Return of the lever 85 to its normal position enables spring 83 to pivot lever 81 so that its other end will move upwardly to raise the levers 87 over their dead-centre position as is shown in FIG. 6c and in ghost in FIG. 4.

Figure 4:
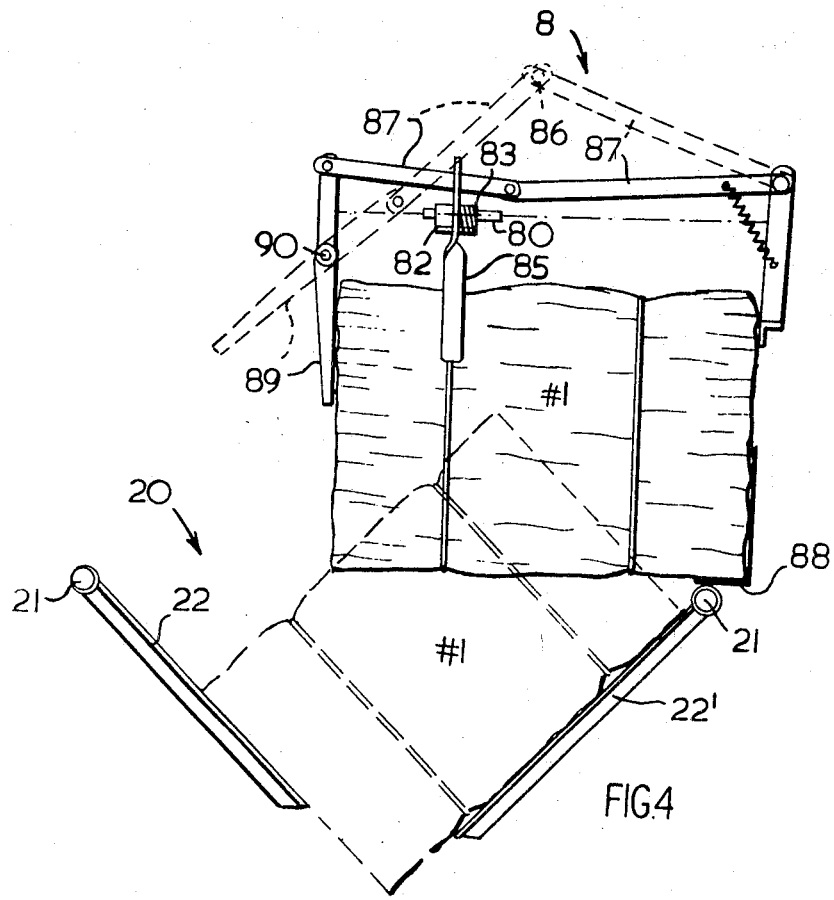
FIGS. 4 and 5 are detail views.

The weight of bale #1 turns plate 89 outwardly, as is also shown in ghost in FIG. 4, releasing said bale on to the placing-rack 20 located underneath. By changing the relative position of the support ledge 88 and turning plate 89 of the bale-turner 8, the bale can be placed so that it lies with its open end on any desired side of the placing-rack 20.

The weight of bale #1, upon sliding into the placing-rack 20, causes the trailing end of placing lever 11 to pivot downwardly about pivot point 15 causing the leading end of said lever 11 to pivot upwardly which results in the pressure exerted on the stud 55 by the roller 37 being removed. This enables a spring 75, associated with positioning guide 54, to pivot the latter about pivot point 53 causing engagement of the latch 56 with guide lock 57. The downward movement of the trailing end of placing lever 11 caused by the weight of bale #1, enables the bale placing-rack 20 to move downwardly where it is located just above the stook-rack 9 in bale #1 position (see FIG. 7). Such downward movement of placing lever 11 causes pull rods 30 and 70 to move the rack opening lever 72 about its pivot 73 so that pin 74 will move into the aligned slot 43 in control disc 42. The amount of pivotal movement of lever 72 is limited by engagement of the stop 76 carried thereby with the aligned stud 44, such studs extending from the rear face of the control disc 42 at various predetermined distances. The spring-loaded end 31 of pull rod 30 slows down the amount of downward pivotal movement of lever 11 when the amount of pivotal movement of lever 72 is limited by stop 76 engaging an aligned stud 44. Hence, the limited amount of pivotal movement of the lever 72 permits the trailing end of placing lever 11 to swing downwardly to a nominal 6" distance above the actual stooking position. This permits the rack locking lever 29 to withdraw its operative end from engagement with the placing-rack locks 24 during an additional 2" amount of downward movement of the trailing end of placing lever 11.

Figure 7:
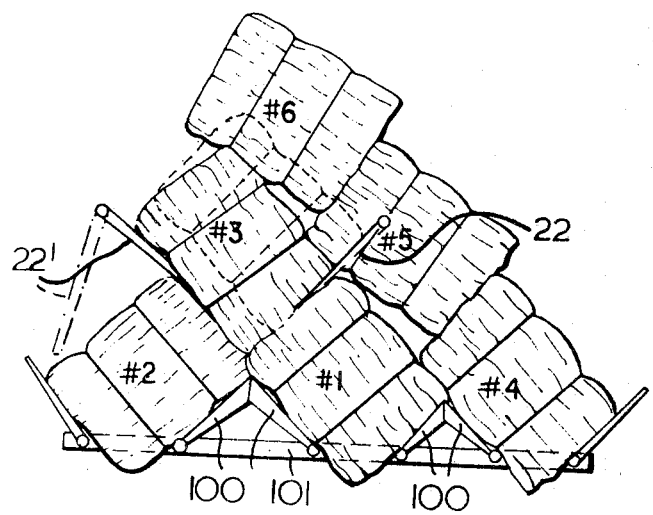
FIG. 7 is an elevation of one type of stook assembled by the machine.

Release of the locks 24 enables the weight of bale #1 to pivot the placing rack side bars 22, 22' thereby opening the placing rack 20 so that bale #1 will slide down on to the bale supports 100 of the stook-rack 9 and occupy the position shown in FIG. 7.

During the time that the bale is held in the placing-rack 20, and which has brought about downward pivotal movement of the trailing end of placing lever 11, the first 8" of such movement enables roller 36 to swing the cam lever 34 about its pivot point 35 in a counter-clockwise direction actuating pull rod 70 to cause pivotal movement of the bell crank lever 68. Such pivotal movement of lever 68 enables the vertical lever 67 to pivot the cross-lever 61 so that its free end will move upwardly within the guide 63, as is shown in ghost in FIG. 1, against the action of spring 64.

Such movement will cause the roller 59 on lever 60 to ride on the periphery of ratchet wheel 58 and to enter the next notch of the latter.

When the bale is released from the placing-rack 20, the action of leaf spring 16 acting against roller 17 causes the placing lever 11 to pivot upwardly to return to its original position. Simultaneously, the rack lock springs 25 will cause the bars 22, 22' of placing-rack 20 to return to their original bale-receiving position and the operative end 33 of the rack locking lever 29 will re-engage the placing-rack locks 24 to re-lock said placing-rack.

Upward pivotal movement of the placing lever 11 enables pull rod 71 to disengage pin 74 from control disc 42, and roller 36 permits cam lever 34 to pivot in a clockwise direction causing pull rod 70 to return bell-crank 68 to its normal position permitting spring 64 to assert itself to move the free end of lever 61 downwardly in the guide 63.

With the return of the trailing end of placing lever 11 upwardly, the leading end thereof moves downwardly a sufficient distance for the roller 37 on said leading end to contact stud 55 thereby pivoting guide 54 rearwardly against the action of spring 75 and disengaging latch 56 from guide lock 57 for re-positioning by cam plate 49.

Hence, as the spring 64 pulls lever 61 downwardly, movement of lever 60 and roller 59 actuates ratchet wheel 58 through one sixth of a full rotation, plate 77 serving as a stop to prevent over-running of the ratchet wheel. Such movement of ratchet wheel 58 causes corresponding movement, i.e. one sixth of a full rotation or 60° of clockwise movement, to control cam plate 49 and control disc 42, through the intermediary of a corresponding amount of rotation of shaft 41. This rotational movement of shaft 41 positions guide 54 and its latch 56 in alignment with the bale #2 position of the guide lock 57 and, in so doing, will cause the placing lever 11 to swing sideways on pivot support 10.

By this time, bale #2 will have been received by the placing-rack 20 from the bale-turner 8 so that the weight of said bale #2 will cause the trailing end of placing lever 11 to again move downwardly and the same cycle will be initiated as described above in connection with bale #1. However, the abovementioned partial rotation of shaft 41 and opening disc 42 will have positioned a stud 44, of a different length, in alignment with the projecting stop 76 on bell crank lever 72. Hence, this will cause the placing rack 20, during the second cycle of the apparatus, to open at the appropriate level for bale #2.

In order to place bale #2 stook-rack 9 in an opposite slanted position to that occupied by bale #1 (see FIG. 7), the placing-rack 20 will place bale #2 on the side of bale #1 as is indicated in ghost in said FIG. 7 with the bars 22 of said placing-rack 20 interposed between bales #1 and #2. Hence, when the placing-rack 20 is actuated to open, only bars 22' will be free to pivot and assume the position shown in ghost in FIG. 7, thus allowing bale #2 to slide into the desired position, the ghost position of bars 22' preventing bale #2, during such placement, from bouncink off the side of the stook-rack 9, the slots in the placing-rack connecting rods 23 permitting opening of one set of bars 22, 22' while the other set is being restrained such as by being interposed between two bales.

The mechanism repeats the cycle of operations, as described above, for bales #3, #4, #5 and #6 at their appropriate levels and positions on the stook-rack 9. In other words, the variations in curve of the cam plate 49 and the variation in throw of lever 72 caused by the stop 76 engaging with studs 44 of different lengths, together with the remainder of the mechanism, causes the placing lever 11 to pivot up and down on pivot point 15 to selected vertical levels and to swing from side to side about pivot support 10 to selected transverse positions. Hence, the placing-rack 20 will be similarly moved to selected vertical levels and transverse positions.

When the placing level 11 pivots in a horizontal plane as well as in a vertical plane (as in the case of the placement of bale #5 for example), the placing-rack 20 will be maintained parallel with the stook-rack 9 by the tie rod 26, said placing-rack 20 being capable of pivotal movement on lever 11 through the intermediary of pivot 19.

OPERATION OF STOOK-RACK

When the stook-rack 9 has received the final bale, in this case bale #6, and control disc 14 is moving to its next position, i.e. to condition the machine to receive the first bale of the next stook, the release trip 45 on the disc 14 will have reached a position where it will contact the trip lever roller 46 on trip lever 47 and cause pivotal movement of the latter.

This will cause the connecting rod 48 to pull the catch 113 of the stook-rack 9 forwardly against the action of its spring 119 thereby releasing roller 112. The weight of the assembled stook on the stook-rack 9 will cause the latter to swing downwardly (as is shown in ghost in FIG. 5) about pivots 105. Inasmuch as said stook-rack is only connected to the machine at said pivot points 105, the stook-rack 9 is adjustable in a vertical plane to suit varying ground conditions encountered when the stook is unloaded. When lowered, the stook-rack 9 is also free to swivel about pivot 117 thereby allowing the stooker to unload the stook undisturbed while turning corners to the left or right.

After placement of the stook onto the ground, and due to the weight of the stook-rack being relieved, the springs 115 will return said stook-rack to its bale-receiving position where the catch 113 will re-engage the roller 112.

Figure 5:
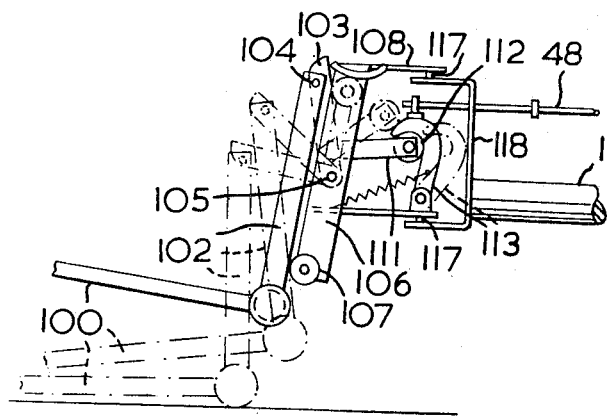

The stook-rack 9, as is shown in full lines in FIGS. 2 and 5, is slightly inclined to the vertical during the time that the stook is being assembled thereon so that the bales will not slide off said rock during formation of the stook and, during lowering of the stook-rack, the latter is slightly declined as shown in ghost in said FIGS. 2 and 5 to assist placement of the stook onto the ground.

Figure 8:
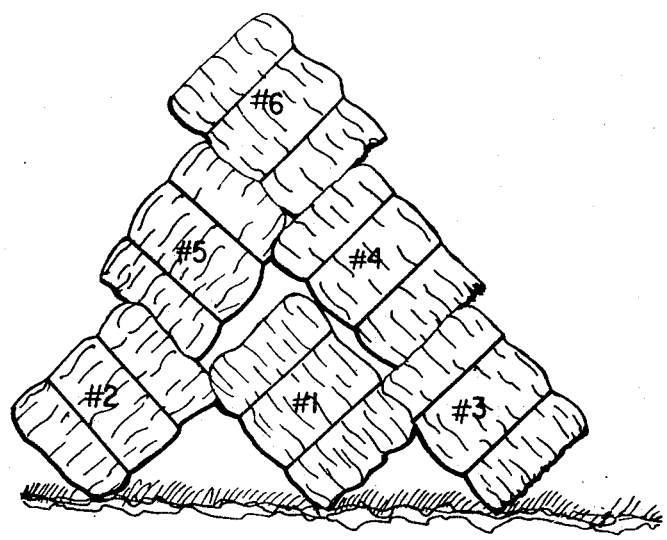
FIG. 8 is an elevation of another type of stook assembled by the machine.

The type of stook shown in FIG. 7 is assembled as has been described above. If desired, however, the type of stook shown in FIG. 8 can be built up by employing a differently shaped cam plate 49 and arranging for bale #5 to be slanted and stacked as has been described above in connection with bale #2.

From the above description, it will be appreciated that the placing lever 11 is capable of pivoting movement about a horizontal axis as well as a vertical axis, delivery of each bale to the placing-rack 20 causing pivoting of the lever 11 about its horizontal axis 15. The opening disc 42 and cam plate 49 constitute control means, actuated by the pivotal movement of the placing lever 11 about its horizontal axis 15, for controlling the vertical and horizontal position of the left-hand end (as viewed in FIG. 1) of the lever 11 and, hence, a similar positioning of the placing-rack 20 as well as the opening and closing of the latter and the release of the stook-rack 9 to lower the stook onto the ground when the pre-arranged bale order thereon has been completed.

The control or opening disc 42, with first linkage means 71–74 and 76 interconnecting the lever 11 and said disc 42, controls the vertical positioning of the placing-rack 20. Moreover, the disc 42, with second linkage means 23–25 and 29–33 interconnecting the disc 42 and placing-rack 20, effects unlocking of the latter. Linkage 26–28 constitutes further linkage means associated with the actuating or placing lever 11 for effecting re-locking of the placing-rack 20 when the stook-rack 9 has received a bale therefrom.

In addition, and as will also be appreciated from the above description, the control cam plate 49, through the pivotable guide 54 and latch 56 both associated with the placing lever 11 and cam plate 49, control the horizontal position of said lever 11 and, hence, the horizontal position of the placing-rack 20.

Furthermore, the disc 42 will, through the intermediary of release trip 45, roller 46 and third linkage means 47, 48, and latch mechanism 113 unlatch the stook-rack 9 to lower a stook to the ground.

I claim:

1. A machine for stooking bales in a pre-arranged order comprising: a bale turner; a normally closed placing rack, said bale turner adapted to orientate and deliver each bale in a predetermined position to said placing rack; a bale ramp for receiving and guiding each bale to said bale turner, an actuating lever capable of pivoting about a horizontal axis and a vertical axis, said placing rack being carried by one end of said actuating lever, delivery of each bale to said placing rack causing pivoting of said lever about its horizontal axis; control means actuated by said pivotal movement of said lever for controlling the vertical and horizontal position of the placing rack and opening and closing of the latter; and a stook rack adapted to receive bales from the placing rack upon opening thereof whereby a stook is formed; said control means also releasing the stook rack to lower said stook onto the ground when the pre-arranged bale order has been completed.

2. A machine for stooking bales in a pre-arranged order comprising: a bale turner; a normally closed placing rack, said bale turner adapted to orientate and deliver each bale in a predetermined position to said placing rack; a bale ramp for receiving and guiding each bale to said bale turner; an actuating lever capable of pivoting about a horizontal axis and a vertical axis, said placing rack being carried by one end of said actuating lever, delivery of each bale to said placing rack causing pivoting of said lever about its horizontal axis; a control disc and a control cam plate both actuated by said pivotal movement of said lever for controlling the vertical and horizontal position of the placing rack and opening and closing of the latter; and a stook rack adapted to receive bales from the placing rack upon opening thereof whereby a stook is formed; said control disc releasing the stook rack to lower said stook onto the ground when the pre-arranged bale order has been completed.

3. A machine for stooking bales in a pre-arranged order comprising: a bale turner; a normally closed placing rack, said bale turner adapted to orientate and deliver each bale in a predetermined position to said placing rack; a bale ramp for receiving and guiding each bale to said bale turner; an actuating lever capable of pivoting about a horizontal axis and a vertical axis, said placing rack being carried by one end of said actuating lever, delivery of each bale to said placing rack causing pivoting of said lever about its horizontal axis; a control disc and a control cam plate both actuated by said pivotal movement of said lever, said control disc controlling the vertical position of the placing rack and opening and closing of the latter, and said cam plate controlling the horizontal position of said placing rack; and a stook rack adapted to receive bales from the placing rack upon opening thereof whereby a stook is formed; said control disc releasing the stook rack to lower said stook onto the ground when the pre-arranged bale order has been completed.

4. A machine for stooking bales in a pre-arranged order comprising: a bale turner; a normally closed and locked placing rack, said bale turner adapted to orientate and deliver each bale in a predetermined position to said placing rack, a bale ramp for receiving and guiding each bale to said bale turner; an actuating lever capable of pivoting about a horizontal axis and a vertical axis, said placing rack being carried by one end of said actuating lever, delivery of each bale to said placing rack causing pivoting of said lever about its horizontal axis; a control disc and a control cam plate both actuated by said pivotal movement of said lever, said control disc controlling the vertical position of the placing rack and locking and unlocking of the latter, and said cam plate controlling the horizontal position of said placing rack; and a normally latched stook rack adapted to receive bales from the placing rack upon unlocking of the latter whereby a stook is formed; said control disc unlatching the stook rack to lower said stook onto the ground when the pre-arranged bale order has been completed.

5. A machine for stooking bales in a pre-arranged order comprising: a bale turner; a normally closed and locked placing rack, said bale turner adapted to orientate and deliver each bale in a predetermined position to said placing rack; a bale ramp for receiving and guiding each bale to said bale turner; an actuating lever capable of pivoting about a horizontal axis and a vertical axis, said placing rack being carried by one end of said actuating lever, delivery of each bale to said placing rack causing pivoting of said lever about its horizontal axis; a control disc and a control cam plate both actuated by said pivotal movement of said lever; said control disc, with first linkage means interconnecting said lever and said disc, controlling the vertical position of the placing rack and, with second linkage means interconnecting said disc and said placing rack, effecting unlocking of the latter, said cam plate, through a pivotable latch member associated with said lever and said plate, controlling the horizontal position of said placing rack; and a normally latched stook rack adapted to receive bales from the placing rack upon unlocking of the latter whereby a stook is formed; said control disc, through third linkage means and latch mechanism unlatching the stook rack to lower said stook onto the ground when the pre-arranged bale order has been completed.

6. A machine for stooking bales in a pre-arranged order comprising: a bale turner, a normally closed and locked placing rack, said bale turner adapted to orientate and deliver each bale in a predetermined position to said placing rack; a bale ramp for receiving and guiding each bale to said bale turner; an actuating lever capable of pivoting about a horizontal axis and a vertical axis, said placing rack being carried by one end of said actuating lever, delivery of each bale to said placing rack causing pivoting of said lever about its horizontal axis; a control disc and a control cam plate both actuated by said pivotal movement of said lever, said control disc, with first linkage means interconnecting said lever and said disc, controlling the vertical position of the placing rack and, with second linkage means interconnecting said disc and said placing rack, effecting unlocking of the latter, said cam plate, through a pivotable latch member associated with said lever and said plate, controlling the horizontal position of said placing rack; a normally latched stook rack adapted to receive bales from the placing rack upon unlocking of the latter whereby a stook is formed; and further linkage means, associated with the actuating lever, for effecting relocking of the placing rack when said stook rack has received a said bale; said control disc, through third linkage means and latch mechanism unlatching the stook rack to lower said stook onto the ground when the pre-arranged bale order has been completed.

7. A machine for stooking bales in a pre-arranged order comprising: a bale turner; a normally closed and locked placing rack, said bale turner adapted to orientate and deliver each bale in a predetermined position to said placing rack; a bale ramp for receiving and guiding each bale to said bale turner; an actuating lever capable of pivoting about a horizontal axis and a vertical axis, said placing rack being carried by one end of said actuating lever, delivery of each bale to said placing rack causing pivoting of said lever about its horizontal axis; a control disc and a control cam plate both actuated by said pivotal movement of said lever; said control disc, with first linkage means interconnecting said lever and said disc, controlling the vertical position of the placing rack and, with the second linkage means interconnecting said disc and said placing rack, effecting unlocking of the latter, said cam plate, through a pivotable latch member associated with said lever and said plate, controlling the horizontal position of said placing rack; a normally latched stook rack adapted to receive bales from the placing rack upon unlocking of the latter whereby a stook is formed; said stook rack being pivotable in a horizontal plane whereby it is capable of depositing a said stook when the machine is cornering; further linkage means, associated with the actuating lever, for effecting relocking of the placing rack when said stook rack has received a bale; and ratchet mechanism under the control of said actuatng level for repositioning said control disc and said cam plate after said stook rack has received each said bale; said control disc, through third linkage means and latch mechanism unlatching the stook rack to lower said stook onto the ground the pre-arranged bale order has been completed.

References Cited

UNITED STATES PATENTS

| | | |
|---|---|---|
| 3,223,253 | 12/1965 | Garbe et al. |
| 3,370,719 | 2/1968 | Oler. |
| 3,375,940 | 4/1968 | Thompson et al. |
| 3,400,839 | 9/1968 | Jay et al. |

GERALD M. FORLENZA, Primary Examiner

R. J. SPAR, Assistant Examiner

U.S. Cl. X.R.

214—77, 518